United States Patent [19]
Nunes

[11] Patent Number: 5,238,262
[45] Date of Patent: Aug. 24, 1993

[54] BRACKET AND BUSHING ASSEMBLY FOR WALKING BEAM OF VEHICLE WHEEL SUSPENSION SYSTEM

[76] Inventor: Anthony M. Nunes, 1401 North Elk/Valley Rd., Crescent City, Calif. 95531

[21] Appl. No.: 796,093

[22] Filed: Nov. 21, 1991

[51] Int. Cl.$^5$ .............................................. B60G 5/00
[52] U.S. Cl. .................................... 280/681; 280/687; 280/716
[58] Field of Search ............... 280/661, 677, 678, 679, 280/680, 687, 716

[56] References Cited

U.S. PATENT DOCUMENTS

| | | | |
|---|---|---|---|
| 3,043,606 | 7/1962 | Raidel | 280/677 |
| 3,069,184 | 12/1962 | Hickman | 280/677 |
| 3,202,439 | 8/1965 | Hickman | 280/677 |
| 3,323,811 | 6/1967 | Nelson | 280/681 |
| 4,082,316 | 4/1978 | Raidel | 280/687 |
| 4,500,100 | 2/1985 | McWhorter et al. | 277/235 B |
| 4,775,166 | 10/1988 | Van Denberg et al. | 280/677 |
| 4,968,055 | 11/1990 | Reilly | 280/661 |

FOREIGN PATENT DOCUMENTS 1505342 9/1969 Fed. Rep. of Germany .
1373613 11/1974 United Kingdom .

*Primary Examiner*—Kenneth R. Rice
*Attorney, Agent, or Firm*—Townsend and Townsend, Khourie and Crew

[57] ABSTRACT

An improved bracket and bushing combination for the end of a walking beam forming a part of a wheel suspension system of a large truck. The bracket is a hollow housing having an end opening and side holes for receiving bolts which are threaded into the ends of a bushing after the bushing has been inserted into the housing through the end opening. The bushing is carried at one end of a walking beam, and the bushing is held in the housing by mounting elements which are secured in place over the end opening by bolts and nuts in partial surrounding relationship to the bushing. In one form of the bushing, the shaft of the bushing is concentric to the resilient core member surrounding the shaft. In another form of the bushing, the shaft is eccentric to the core member.

13 Claims, 5 Drawing Sheets

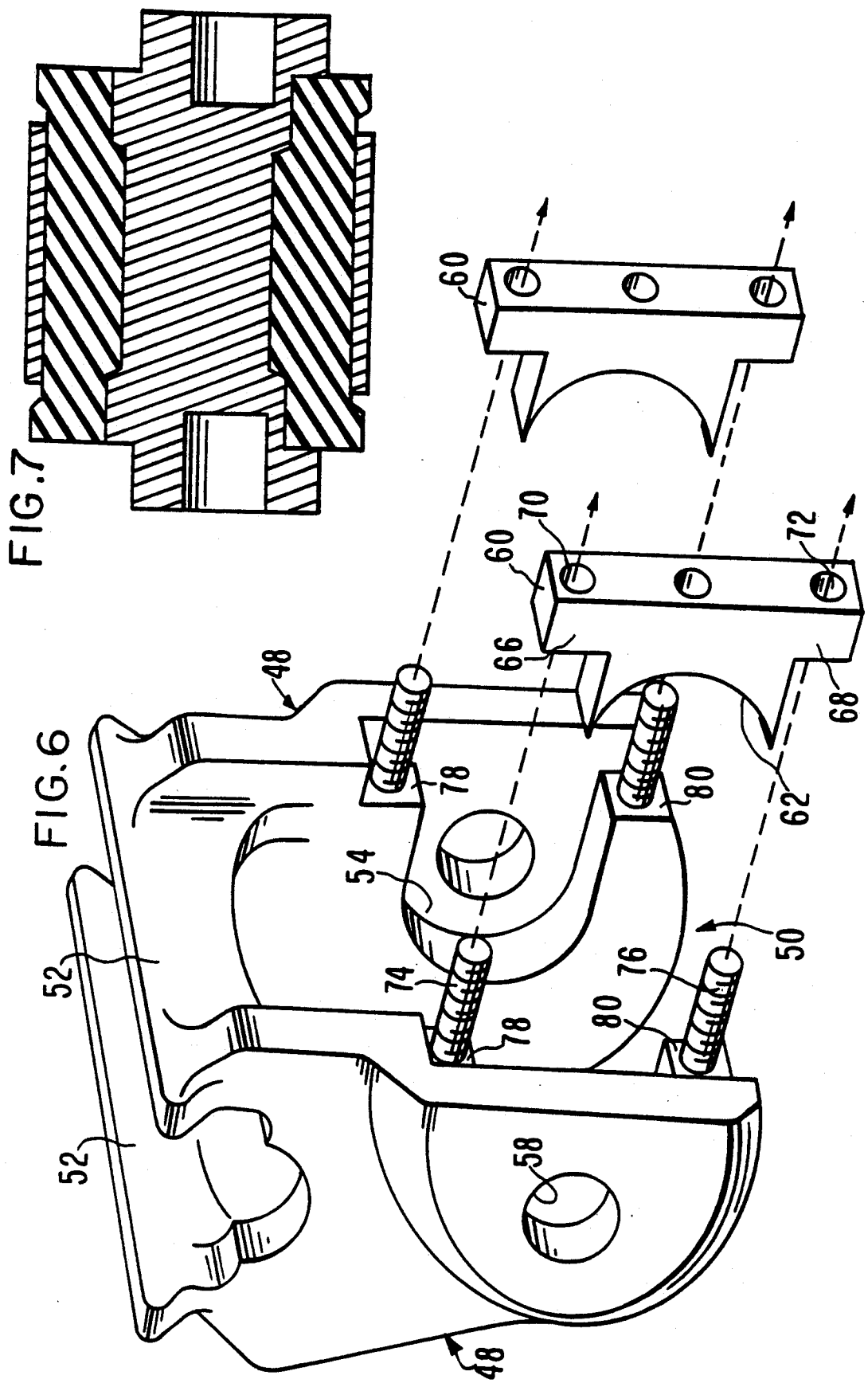

BRACKET AND BUSHING ASSEMBLY FOR WALKING BEAM OF VEHICLE WHEEL SUSPENSION SYSTEM

This invention relates to improvements in suspension systems for vehicle wheels, such as wheels on heavy duty trucks and trailers and, more particularly, to an improved bracket-bushing combination of a vehicle suspension system.

BACKGROUND OF THE INVENTION

Heavy duty trucks and trailers (hereinafter "trucks") typically have rear wheels which are mounted on a suspension system secured to the frame of the truck by frame hangers. Axle housings are coupled to the frame hangers by welding or other attachment means. The axle housings mount rear wheel axles which may be a single axle or two axles depending upon the size of the truck. Typically, there are two axle at the rear of a heavy duty truck and each end of each axle has an axle housing.

A walking beam is provided on each side of the truck, respectively. The ends of each walking beam are provided with respective bushings to absorb the shock applied to the wheels as they move over rocks and cause deflection of the walking beams relative to the suspension system of the truck. The ends of each walking beam are coupled to respective axle housings.

The bushings at the ends of a walking beam typically wear out over time and must be replaced. Until now, the replacement of the bushings has required a substantially complete disassembly of the axle housings from the walking beam of the vehicle suspension system. Such disassembly requires a large amount of time and considerable labor. Moreover, the truck is out of service during this period of disassembly and replacement of a bushing. Such down time of the truck represents a loss of profits to the owner. Thus, it is desirable that such disassembly time and replacement time be minimized to cause the truck to be in service more often and without sacrificing the quality of service in disassembly and replacement. A need exists for improvements in the structure for mounting the bushings on the ends of the walking beam so that the bushings can be quickly and easily replaced in a shorter time than is conventionally possible while at the same time providing a quality mount for the bushings and a long useful operating life for the walking beam itself. The present invention satisfies this need.

Disclosures relating to this general subject matter include the following references: U.S. Pat. Nos. 3,043,606, 3,069,184, 3,202,439, 3,323,811, 4,500,110 and 4,775,166, British Patent 1,373,613 and German Patent 1,505,342.

SUMMARY OF THE INVENTION

The present invention is directed to an improved bracket and bushing combination for the end of a walking beam forming a part of a wheel suspension system of a large truck. The bracket of the present invention is a hollow housing having an end opening for receiving the bushing and side holes for receiving bolts which are threaded into the ends of the bushing after the bushing has been inserted into the housing through the end opening. The bushing is secured to one end of a walking beam, and the bushing is held in the housing by mounting elements which are held over and effectively close the end opening by bolts and nuts in partial surrounding relationship to the bushing.

The bushing and bracket combination provides a structure which is simple and rugged in construction, and one which can withstand heavy duty loads due to road shock. The bushings at the ends of the walking beams can be quickly and easily replaced by disassembling the walking beam and simply removing the bushings from the brackets and replacing the old bushings with new bushings. Down time of the vehicle is minimal so that loss of profit during such down time is minimized. The primary object of the present invention is to provide an improved bushing and bushing combination for the end of a walking beam of a vehicle suspension system wherein the bracket is a housing which receives the bushing when the bushing is on the end of a walking beam so that the bushing can be quickly and easily replaced if necessary, and the time to assemble or disassemble the bushing and bracket combination is minimal to thereby minimize the dow time of the vehicle.

Other objects of this invention will become apparent as the following specification progresses, reference being had to accompanying drawings for illustrations of the preferred embodiment of the invention.

BRIEF DESCRIPTION OF THE DRAWINGS

FIG. 6 is a perspective view of the bracket and the mounting elements for holding the bushing in the bracket;

FIG. 7 is a view similar to FIG. 4 but showing another embodiment of the bushing of the present invention, the bushing having an eccentric shaft which rotates within a urethane bushing to allow positive adjustment;

DESCRIPTION OF THE PREFERRED EMBODIMENT

Figure 1:
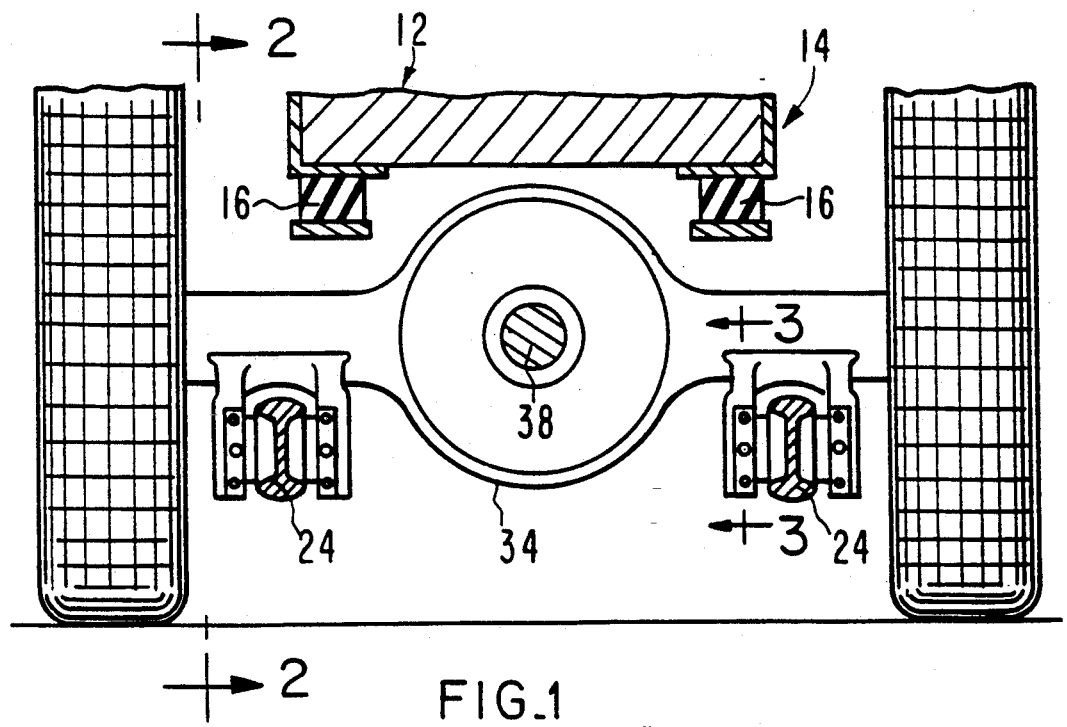
FIG. 1 is a rear elevational view of a vehicle suspension system for a heavy duty truck having walking beams on each side of the vehicle adjacent to a pair of rear wheels, the view taken along lines 1—1 of FIG. 2.
Figure 2:
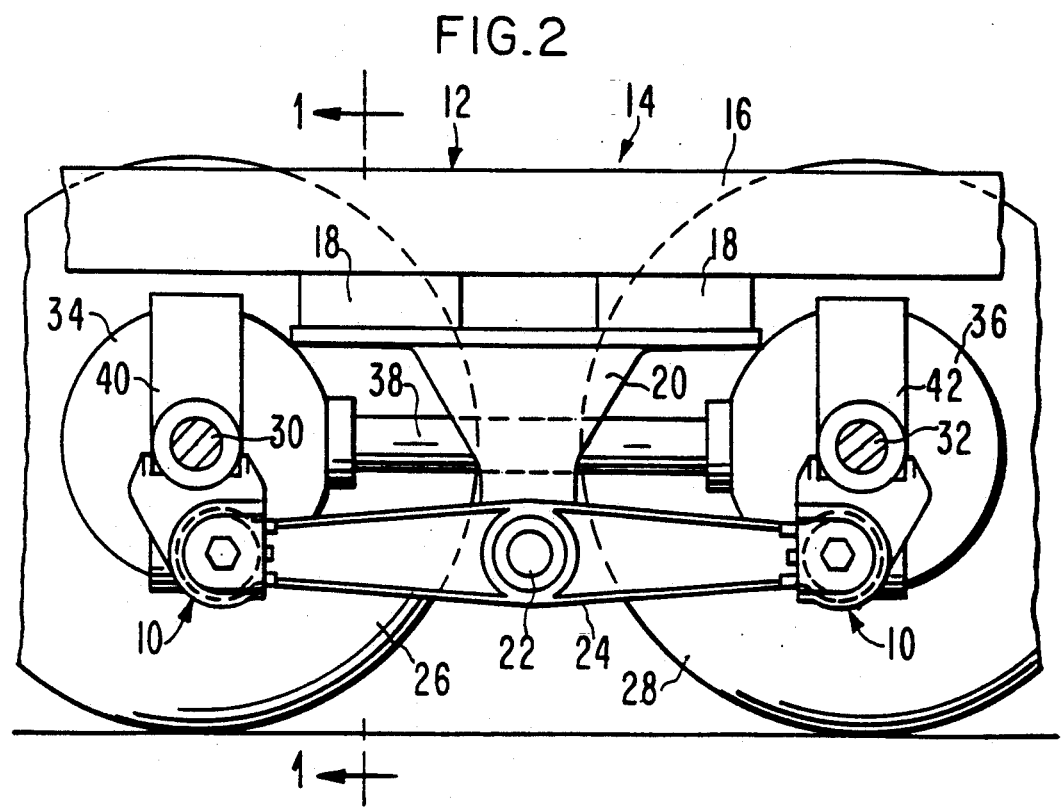
FIG. 2 is a cross-sectional view taken along line 2—2 of FIG. 1.

The bracket and bushing combination of the present invention is broadly denoted by the numeral 10 and is to be used with a truck or trailer 12 having a suspension system 14 which mounts to a frame 16 by frame hangers 18 (FIG. 2). The frame hangers 18 are coupled by connector members 20 to the central portions 22 of walking beam 24 which are normally horizontal and extend fore and aft on respective sides of the truck near wheels 26 and 28 as shown in FIG. 1. Thus, there is a walking beam 24 for each pair of tandem rear wheels 26 and 28 mounted on axles 30 and 32, respectively. The gear housings 34 and 36 are coupled with respective axles 30 and 32 and with gear connective element 38 as shown in FIG. 2.

Axle housings 40 and 42 are connected to suspension system 14 and the bushing-bracket combination 10 of the present invention is coupled to respective axle housings 40 and 42. Since there are two walking beams and there are two ends to each walking beam. There is also a bushing-bracket combination for each end of a walking beam. Thus, there will be a total of four bushing-bracket combinations 10 mounted on the truck.

Each bushing-bracket combination comprises a shell-like bracket 44 for receiving bushing 46 in the manner shown in FIG. 6. Each bracket 44 has a pair of spaced side walls 48 provided with lower open end 50 and a pair of cross pieces 52 connecting side walls 48 as shown in FIG. 6. Cross pieces are welded or otherwise attached by mounting bolts (not shown) to axle housing 40 or 42. Moreover, each side wall 48 has a hollow inner recess 54 for receiving an annular end portion 56 of bushing 46 in the manner shown in FIG. 4. The end portions 56 of the bushing slidingly fit in the recesses 54. A hole 58 in each side wall 48 is alignable with an internally threaded hole 60 in each end of the bushing hole 60 receives a bolt 62 having a head 64, the bolt 62 being threaded into hole 60 for removably connecting the bushing 46 to the corresponding bracket 44.

Figure 3:
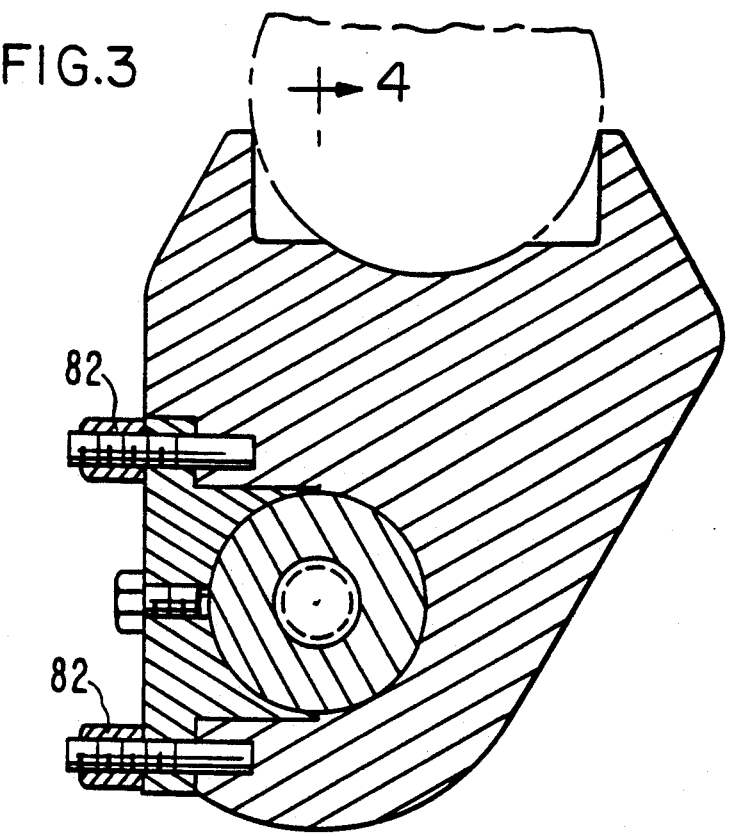
FIG. 3 is a cross-sectional view taken along line 3—3 of FIG. 4.

Parts 56 of bushing 46 are generally cylindrical or annular and are fitted into semi-circular recesses 54 as shown in FIG. 3. When the parts 56 of bushing 46 are in the recesses 54 of side walls 48 of bracket 46, the cylindrical configuration of parts 56 seats parts 56 in the assembly position shown in FIG. 3. To hold the bushing 46 in the shell-like bracket 48, a pair of holding elements 60 (FIGS. 3 and 6) are provided, the elements each having a semi-cylindrical surface 62 for partially surrounding the curved parts 56 of bushing 46 which are closest to the lower open end 50 of bracket 44 as shown in FIG. 3. Each element 60 further includes post-like projections 66 and 68 provided with holes 70 and 72 for receiving threaded studs 74 and 76 projecting outwardly from end faces 78 and 80 of bracket 46 as shown in FIG. 6.

Studs 74 and 76 are press fitted in holes 70 and 72 of respective elements 60, and the elements are coupled to end faces 78 and 80 by nuts 82 (FIG. 3). Thus, elements 60 are releasably coupled to bracket 46 and the elements hold the bushing 46 in the shell-like bracket 48 with a walking beam 24 coupled to the bushing. In this way, bracket 48 and elements 68 present a quick-release fastening means for replaceably mounting a bushing in the bracket 48 with the bushing being on a respective end of walking beam 24.

When it is desired to replace bushing 46, nuts 82 are backed off and elements 60 are removed from studs 74 and 76. Then, the end of the walking beam with a bushing 46 on the walking beam can be removed from the old bracket 48 and the old bushing can then be removed from the end of the walking beam and replaced with a new bushing.

Then, the new bushing on the end of the walking beam can be inserted into the shell-like bracket 48 (FIG. 6), the bolts 62 threaded into the end portions 56 of the new bushing 46 (FIG. 4) and elements 60 are moved onto studs 74 and 76, following which nuts 82 releasably couple the elements 60 to bracket 48. Once the new bushing is in place as described above, the vehicle can be driven until it is necessary to replace the bushing once again in a manner described above.

Figure 4:
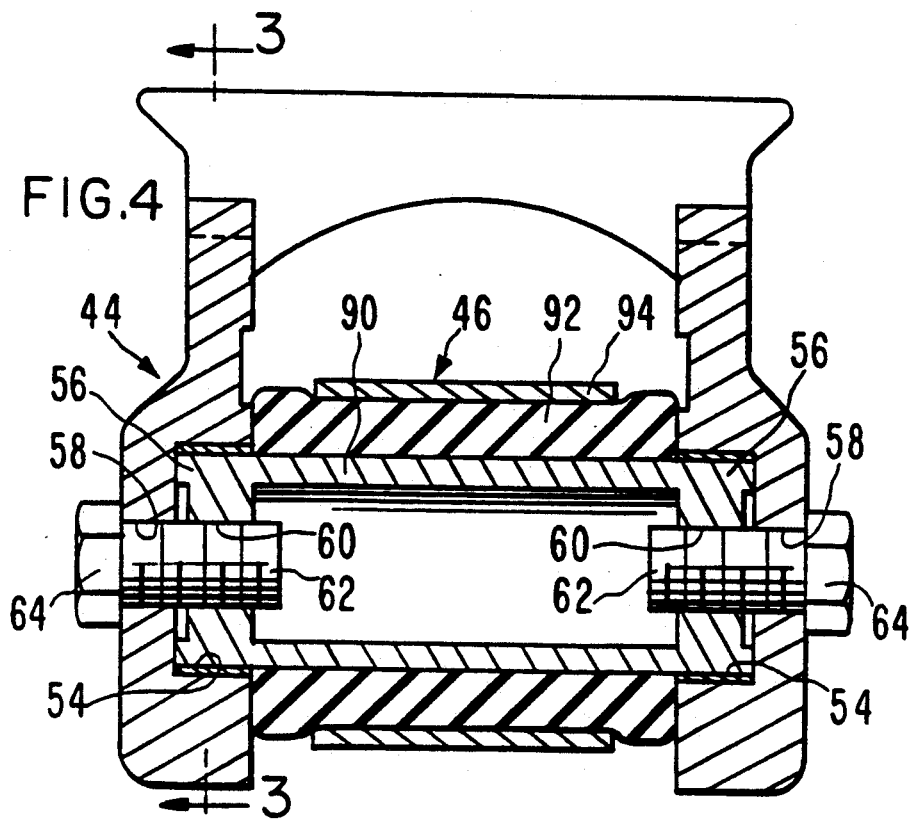
FIG. 4 is a cross-sectional view taken along line 4—4 of FIG. 3.
Figure 5:
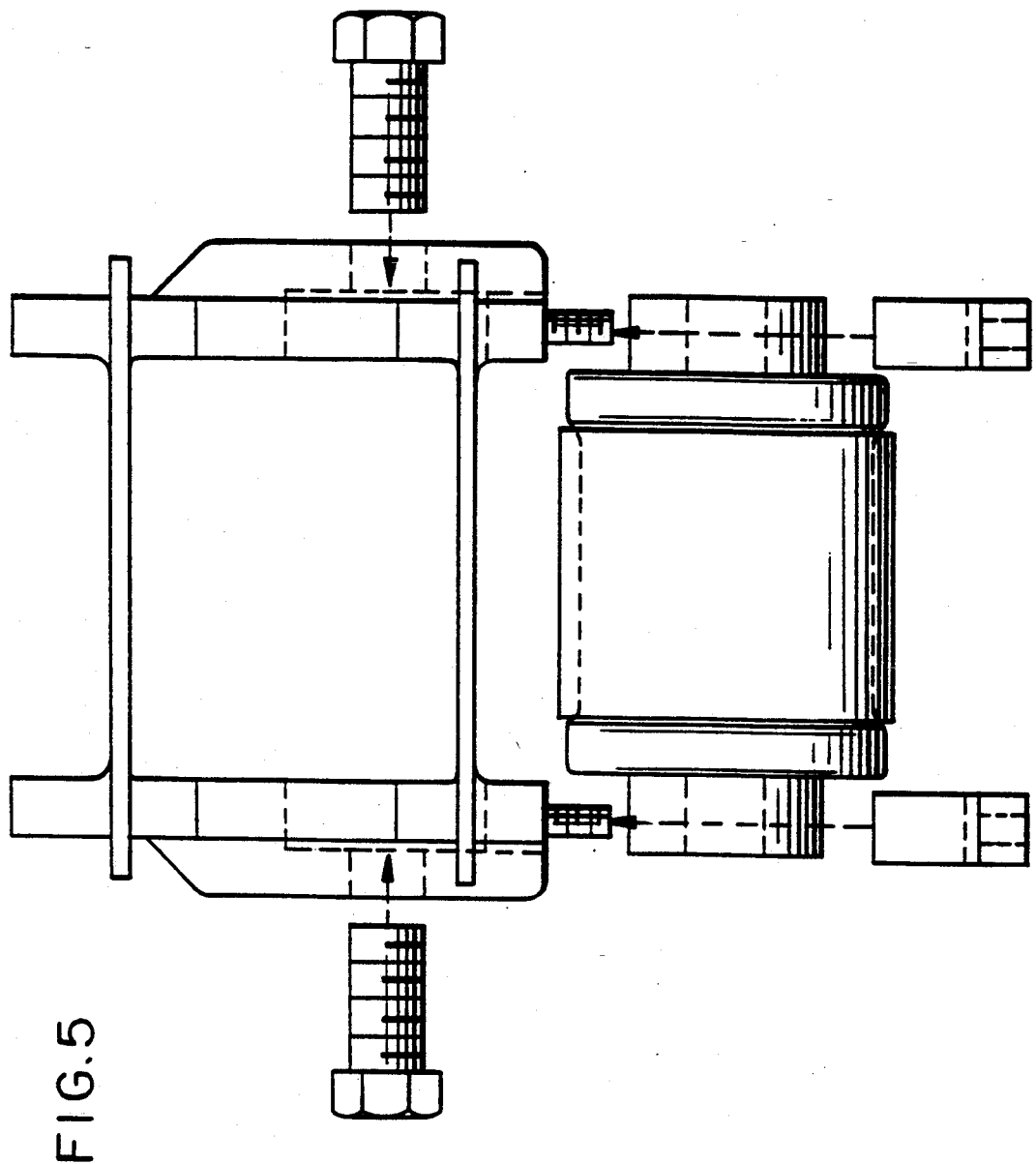
FIG. 5 is an exploded view of the bracket and the bushing.

A preferred embodiment of the bushing 46 is shown in FIG. 4. In this case, bushing 46 includes a cylindrical base body 90 on which a sleeve-like core member of a resilient material 92 is bonded. A cylindrical tube 94 is bonded to the outer surface of core member 92, and tube 94 is coupled to the walking beam as is well known.

Figure 8:
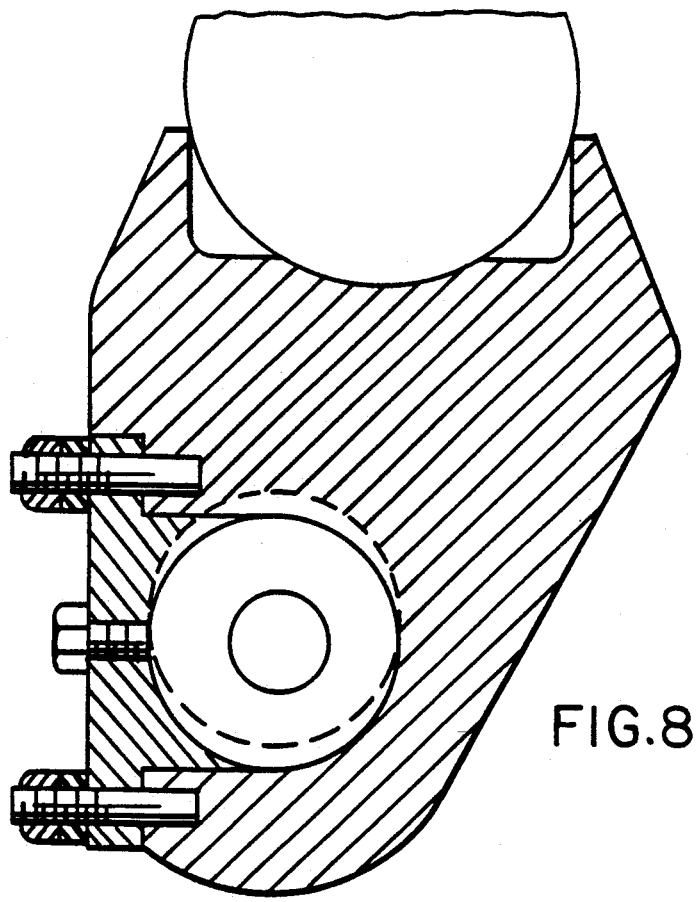
FIG. 8 is a view similar to FIG. 3 but showing the embodiment of the bushing of FIG. 7 coupled with a bracket of the present invention.
Figure 9:
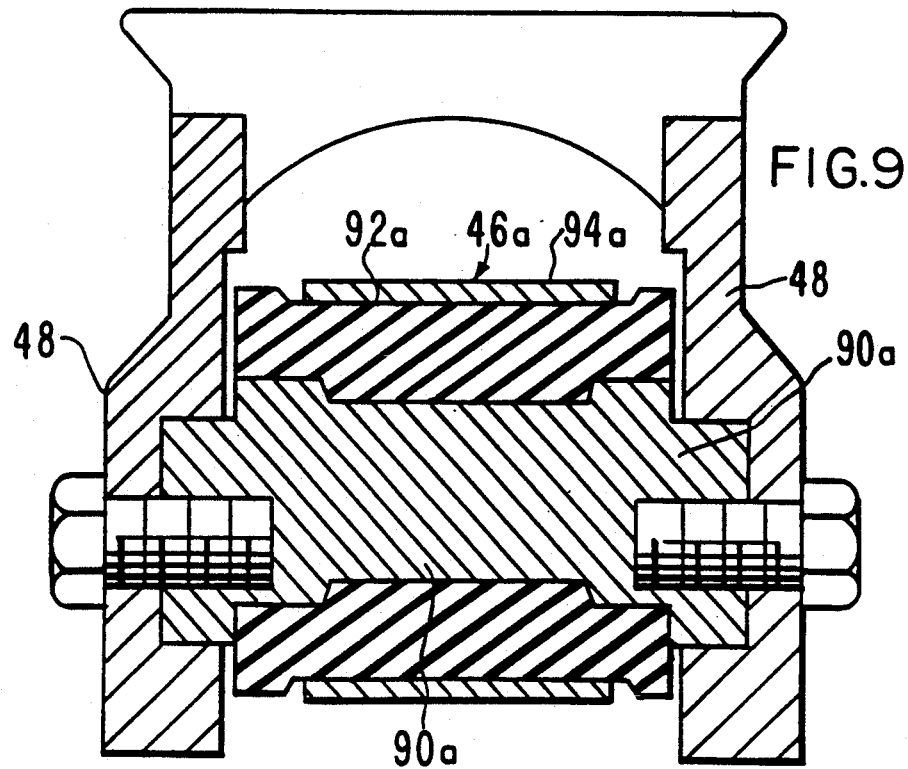
FIG. 9 is a view similar to FIG. 4 but showing the eccentric bushing of FIG. 7.

FIG. 8 and 9 show a modified version of the bushing of the present invention. To this end, bushing 46a has an outer cylindrical sleeve 94a and a core member 92a a resilient material bonded to an external shaft 90a mounted on a side walls 48 of bracket 44. A unique feature of bushing 46a of FIGS. 8 and 9 is that the center shaft 90a is eccentric with reference to the holes which receives bolts 62 as shown in FIGS. 8 and 9. Center shaft 90a is adjustably mounted within bracket 44 to allow one-half inch positive adjustment to properly align the tandems wheels 26 and 28 for each walking beam 24, respectively.

What is claimed is:

1. In a vehicle suspension system having a walking beam and an axle housing, the improvement comprising:

a shell-like bracket having a pair of spaced side walls and provided with an end opening, said bracket having means for connecting the bracket to the axle housing;

an elongated bushing adapted for attachment to one end of the walking beam, said bushing being movable through said end opening and into and out of the space between the side walls; and means coupled with each of the side walls, respectively, and the adjacent end of the bushing for releasably securing the bushing to the bracket.

2. The improvement as set forth in claim 1, wherein the bushing comprises a central shaft, a resilient core member on the outer surface of the shaft, and a sleeve on the outer surface of the core member, the ends of the shaft having holes for receiving said securing means.

3. The improvement as set forth in claim 2, wherein said shaft has a central axis, and said holes being coextensive with the central axis.

4. The improvement as set forth in claim 2, wherein the shaft has a central axis, said holes being on a line parallel to and laterally offset from the central axis to provide an eccentric mounting for the shaft.

5. In a vehicle suspension system having a walking beam and an axle housing, the improvement comprising:

a bracket having a shell-like housing and a pair of spaced side walls and provided with an end opening, said bracket having means for connecting the bracket to the axle housing;

a bushing for attachment to one end of the walking beam, said bushing being movable through said end opening and into and out of the space between the side walls; and means coupled with the side walls and the bushing for releasably securing the bushing to the bracket.

6. In a vehicle suspension system having a walking beam and an axle housing, the improvement comprising:

a bracket having a pair of spaced side walls and provided with an end opening, said bracket having means for connecting the bracket to the axle housing;

a bushing for attachment to one end of the walking beam, said bushing being movable through said end opening and into and out of the space between the side walls, the bushing having a pair of annular end parts, each side wall having a recess for receiving a respective end part of the bushing; and means coupled with the side walls and the bushing for releasably securing the bushing to the bracket.

7. The improvement as set forth in claim 6, wherein the bushing has a central axis, each of the said end parts having an axial end hole, and a bolt carried by each end wall of the bracket and threadably received in the end hole of the adjacent end part of the bushing.

8. The improvement as set forth in claim 7, wherein each of said side walls has a hole for receiving the respective bolt, the holes in the end parts being threaded, there being a threaded connection between each bolt and the respective hole in the end of the corresponding end part of the bushing.

9. In a vehicle suspension system having a walking beam and an axle housing, the improvement comprising:

a bracket having a pair of spaced side walls and provided with an end opening, said bracket having means for connecting the bracket to the axle housing;

a bushing for attachment to one end of the walking beam, said bushing being movable through said end opening and into and out of the space between the side walls, each end of the bushing having an annular outer end part, each side wall having an inner face and a recess on each inner face of each sidewall, respectively, each recess having a surface substantially complemental to the outer end part of the bushing; and means coupled with the side walls and the bushing for releasably securing the bushing to the bracket.

10. The improvement as set forth in claim 9, wherein the recess of each side wall is semi-circular, said securing means including a holding element having a semi-circular surface for placement adjacent to an end part of the bushing, and bolt means for securing the holding element to a side wall of the bracket.

11. The improvement as set forth in claim 10, wherein is included a second holding element substantially identical to the first-mentioned holding element, said holding elements having semi-circular inner surfaces for placement adjacent to respective end parts of the bushing.

12. The improvement as set forth in claim 10, wherein each side wall has an end face, said bolt means being secured to an end wall and projecting therefrom, said bolt means having thread means thereon for receiving a nut for releasably securing the holding element to the bracket.

13. The improvement as set forth in claim 11, wherein each holding element has a semi-circular surface for engaging the bushing, said surface of the holding element being a substantial continuation of the inner surface of the recess of the corresponding side wall.

* * * * *